(12) United States Patent
Masson et al.

(10) Patent No.: US 6,291,042 B1
(45) Date of Patent: Sep. 18, 2001

(54) MULTILAYER RESERVOIR MADE OF THERMOPLASTIC MATERIAL FOR STORING HYDROCARBONS

(75) Inventors: Didier Masson; Thierry Debelle, both of Brussels; Jules-Joseph Van Schaftingen, Wavre; Paul Wouters, Vilvoorde, all of (BE)

(73) Assignee: Solvay (Société Anonyme), Brussels (BE)

( * ) Notice: Subject to any disclaimer, the term of this patent is extended or adjusted under 35 U.S.C. 154(b) by 0 days.

(21) Appl. No.: 08/160,870

(22) Filed: Dec. 3, 1993

(30) Foreign Application Priority Data

Dec. 8, 1992 (BE) .................................................. 9201079

(51) Int. Cl.$^7$ .............................. B65D 85/00; B60P 3/22
(52) U.S. Cl. .................... 428/35.7; 220/562; 206/524.9; 280/830; 261/119.1
(58) Field of Search .................. 428/35.7, 34.1; 220/562, 415, 456, 457; 206/524.1–524.6; 280/830; 261/119.1

(56) References Cited

U.S. PATENT DOCUMENTS

| | | | |
|---|---|---|---|
| 3,606,958 | 9/1971 | Coffman | 220/63 |
| 3,652,368 | 3/1972 | Formo | 156/501 |
| 3,839,278 | 10/1974 | Dexter et al. | 260/45.85 B |
| 3,976,821 | 8/1976 | Carrow et al. | 428/474 |
| 4,925,712 | * 5/1990 | Cicuta et al. | 428/35.7 |
| 5,212,223 | * 5/1993 | Mack et al. | 524/318 |
| 5,213,734 | 5/1993 | Masson et al. | 264/83 |

FOREIGN PATENT DOCUMENTS

| | | |
|---|---|---|
| 3113919A1 | 1/1982 | (DE) . |
| 277370 | 4/1990 | (DE) . |
| 282018 | 8/1990 | (DE) . |
| 0270776A2 | 6/1988 | (EP) . |
| 324106 | 7/1989 | (EP) . |
| 0339413A2 | 11/1989 | (EP) . |
| 0384469A2 | 8/1990 | (EP) . |
| 0393204A1 | 10/1990 | (EP) . |
| 0500166A1 | 8/1992 | (EP) . |
| 86/02023 | 4/1986 | (WO) . |
| 91/89732 | 7/1991 | (WO) . |

OTHER PUBLICATIONS

English abstract of German patent 37 42 933 to Hoechst AG. Derwent Publications Ltd. Abstract No. 89–193441/27.
English abstract of East German Patent 277,370 to VEB Chemische Werke Buna. Abstract No. 90–275831/37.
English abstract of East German Patent 282,018 to VEB Leuna–Werk Ulbricht. Abstract No. 91–029866/05.
Chemical Abstract No. 113: 192813p.
Chemical Abstract No. 114:230106r.
Chemical Abstract No. 112:120017p.

* cited by examiner

Primary Examiner—Rena L. Dye
(74) Attorney, Agent, or Firm—Marina V. Schneller; Venable

(57) ABSTRACT

The wall of the container comprises at least one thick outer layer consisting essentially of a thermoplastic material which imparts good mechanical properties, and a thin inner layer consisting of a thermoplastic material adapted to receive a surface treatment intended to increase its impermeability to hydrocarbons, preferably consisting essentially of one or plurality of virgin polyolefins. The container is particularly suitable for use in automobiles.

13 Claims, No Drawings

MULTILAYER RESERVOIR MADE OF THERMOPLASTIC MATERIAL FOR STORING HYDROCARBONS

The present invention relates to a multilayer container made of thermoplastic material for storing hydrocarbons. This container is particularly suitable for use in automobiles.

Containers made of thermoplastic material, notably those made from polyolefins, demonstrate numerous advantages over their counterparts made of metal, notably, better impact resistance, better resistance to corrosion by exterior agents, increased weight, and greater freedom of form, etc.

However, thermoplastic materials and, particularly, polyolefins have the drawback of not being completely impermeable to a number of solvents and primarily to hydrocarbons used as motor fuel for automobiles.

Taking into account ecologic standards for limiting pollution and respecting the environment, it is thus of prime importance in the realization of such containers to provide the most effective impermeabilization treatment possible.

According to a first means which is described in European Patent Application EP-A-384,469, containers made of polyethylene, for example, may be coated to this end by means of a film of a polymer highly impermeable to solvents such as poly-omega-lactam. However, this technique makes it necessary to resort to an additional manufacturing step, namely, the deposition and polymerization of a suitable film by means of rotational molding, which is time-consuming and expensive.

According to another means described in publication WO 91/09732, such containers may be manufactured from a co-extruded parison including outer layers consisting of polyethylene and an inner layer consisting of previously sulfonated polyethylene. However, taking into account the incompatibility of polyethylene and previously sulfonated polyethylene, and in order to eliminate any subsequent risk of delamination, one is thus directed to use an adhesive intermediary layer, which will complicate the production of such containers and increase their actual cost. Another means, notably described in European Patent Application EP-A-500,166, and which until now has proved to be efficient and very economical, consists in subjecting the inner wall of such containers to a superficial treatment such as fluoration or sulfonation during or after their production.

However, stricter and stricter ecologic standards and the recent introduction of mixed fuels containing oxygenated compounds such as methanol impose higher performance fluoration or sulfonation treatments which place economic restraints on conventional containers produced, notably those made from polyolefins such as polyethylene.

In fact, the polyolefins generally used in order to realize fuel containers by blow molding must meet a number of criteria in order to be able to satisfy the specifications imposed on the final product.

Thus, these polyolefins must, among other things, demonstrate sufficient resistance to:

impact stress-cracking fuel ultraviolet rays.

Moreover, these polyolefins must be economical and exhibit suitable characteristics such as good heat stability and good resistance to oxidation to facilitate their use, and the material must be virgin material or derived from reused ground material and must have suitable characteristics (viscosity, melting behavior, resilience, etc.) for use in blow molding.

Thus, it appears that these requirements make it necessary to use special polyolefins that are generally difficult to treat with superficial fluoration or sulfonation and which require a more energetic and, consequently, longer and more costly treatment.

The applicant has now realized containers of thermoplastic material permitting the simultaneous use of special high-performance resins, notably with respect to mechanical properties while ensuring effective impermeability at less cost.

The present invention relates, therefore, to a multilayer container of thermoplastic material for storing hydrocarbons, which is characterized in that the wall comprises at least a thick outer layer consisting of a thermoplastic material which imparts to it good mechanical properties and a thin inner layer of a thermoplastic material adapted to receive a surface treatment for the purpose of increasing its impermeability to hydrocarbons. The thermoplastic material adapted to receive a surface treatment consists advantageously essentially of one or a plurality of virgin polyolefins.

The container according to the present invention thus has a wall consisting of at least two associated layers and allows the use of at least two materials that specifically meet the requirements, on the one hand, for the blown piece and, on the other hand, for its surface treatment with respect to good impermeabilization.

Thus, proceeding in this manner makes it possible to choose for the material constituting the outer layer, a thermoplastic material, such as, for example, polyethylene uniquely optimized in terms of mechanical properties and having the facility to be employed in blow molding, and for the material constituting the inner layer, a thermoplastic material chosen or developed primarily with the object of easily permitting an effective superficial fluoration or sulfonation treatment. The fluoration treatment is preferred.

The thermoplastic material constituting the outer layer may be one of the thermoplastic materials exhibiting optimization of the desired properties with preference being given to polyolefins and, particularly, to high-density polyethylene (HDPE).

The outer layer may optionally contain a defined proportion of recycled polyolefins, more particularly of re-ground polyolefins provided by a recycling plant of previously used containers. This proportion of re-ground materials may, nevertheless, be chosen in such a way as not to fundamentally affect the properties of the outer layer that is produced.

The thermoplastic material constituting the inner layer may be a polyolefin such as a high-density polyethylene of a quality especially adapted to the treatment of the surface to be utilized. It may also be another thermoplastic material adapted for this type of treatment, such as other polyolefins. Or it may be a mixture of such resins, more particularly, a mixture containing HDPE.

The inner layer essentially consists of one or a plurality of virgin polyolefins. Polyethylene is preferably used as polyolefins and, particularly, a high density polyethylene (HDPE). The inner layer preferably consists essentially of a single virgin polyolefin.

Virgin polyolefin refers to an unrecycled polyolefin, i.e., one which was not subjected to any process involving high temperatures such as extrusion, injection, etc., with the possible exception of a granulation phase, as explained below. For example, polyolefin fragments obtained by grinding tubes or containers consisting of polyolefin do not meet the definition of virgin polyolefin any more than production scraps (waste) collected when polyolefins were employed for extrusion, injection, calendaring, etc.

The term "essentially consisting of" is intended to define that if one or a plurality of other thermoplastic materials (for example, a recycled polyolefin) are used in a mixture with one or a plurality of virgin polyolefins (such as defined above), the total weight of these other thermoplastic materials does not exceed 5% by weight of virgin polyolefin, preferably 1%. One or a plurality of virgin polyolefins are particularly preferred as the one material or the only thermoplastic materials present in the inner layer.

Moreover, the thermoplastic material essentially constituting the inner layer, advantageously exhibits one or a plurality of the properties below, which notably allow to improve the impermeability of superficially treated containers comprising such an inner layer.

According to a preferred modification of the invention, the inner layer is essentially free of any pigment, in contrast to common usage, which is to employ a pigment that gives it a black color.

Advantageously, the inner layer is essentially free of any additive, with the possible exception of one or a plurality of hydroxyaromatic compounds whose hydroxyl group is stearically hindered, preferably chosen from among di-tert-alkylized phenols in the ortho position with respect to the hydroxyl group and their derivatives such as the esters of 3-(3',5'-di-tert-butyl-4'-hydroxyphenyl) propionic acid. Among these compounds the best results were obtained with 3-(3',5'-di-tert-butyl-4'-hydroxyphenyl) propionate of n-octadecyl. If these compounds are present, their total quantity does not exceed 1.3 g per kg of the thermoplastic material constituting the inner layer, and preferably not exceeding 1.1 g per kg. If they are present, their total quantity is at least 0.01 g/kg.

The thermoplastic material essentially constituting the inner layer (which hereinafter is referred to as "internal resin") is generally employed in the form of powder or granules. However, it is preferable to use it in the form of powder, avoiding any stage of the compounding process by melting. If the internal resin is present in the form of powder, and if one wishes to use one or a plurality of additives (under the conditions stated above), the latter may be incorporated into the internal resin by mixing with the powder, or during an agglomeration stage of this powder, or else during synthesis.

These methods of incorporation eliminate the need for proceeding to a compounding process by melting.

According to the preferred mode of production, the inner layer contains a minimum of polyolefin compounds having a low molar mass. Thus, the quantity ($Q_V$) of volatile compounds collected by thermal desorption under a helium flow at 275° C. preferably does not exceed 1,700 mg per kg of thermoplastic material constituting the inner layer, and is ideally 1450 mg per kg. Excellent results were additionally obtained when the inner layer is such that its soluble fraction in boiling hexane ($S_6$) does not exceed 9 g per kg of thermoplastic material constituting the inner layer and that its soluble fraction in boiling heptane ($S_7$) does not exceed 42 g/kg.

In general a minimum content of volatile compounds 0.1 mg/kg, a soluble minimum fraction of 0.01 g/kg in boiling hexane, and a minimum fraction of 0.1 g/kg in boiling heptane is permitted in the inner layer.

An example of thermoplastic material providing good results has the following values: $Q_V$=700 mg/kg, $S_6$=3 g/kg, $S_7$=3.6 g/kg.

Another example of thermoplastic material providing good results has the following values: $Q_V$=1400 mg/kg, $S_6$=7.5 g/kg, $S_7$=35 g/kg.

However, the applicant prefers for both the outer layers and inner layers to be made of polyolefins and, more particularly, of ethylene homopolymers having suitable qualities such that the need to resort to an intermediary layer of ordinary adhesive to ensure a durable solidification of the layers can be avoided. It is preferable for the outer and inner layers both to be made of compatible polyolefins and more particularly of polyethylene notably to avoid having to resort to an intermediary adhesive layer. The high-density polyethylene is preferred.

The thickness of the outer layer, which ensures the mechanical properties of the container is generally relatively important. A thickness ranging between 1 and 20 mm, and preferably between 5 and 10 mm generally proves to be satisfactory.

By contrast, the inner layer which is only required to ensure effective impermeabilization may be relatively thin. In general, a thickness ranging from 10 microns and 1 mm and, preferably, between 50 microns and 0.5 mm proves to be satisfactory.

In case the thermoplastic material chosen to constitute the inner and outer layer of the container according to the invention proves to be incompatible, an optional coextruded intermediary layer of an appropriate adhesive resin capable of durably ensuring their solidification may be provided.

The container according to the invention may be produced easily by the conventional blow molding technique from a suitable multilayer parison made by a coextrusion head, so to speak, or by a conventional extrusion head fed by two or a plurality of concentric streams by way of different extruding devices.

In the container according to the present invention, one proceeds advantageously to a treatment of the surface of the inner layer (fluoration, sulfonation, etc.). This surface treatment may be realized on the production line while it is blow molded. It may also be realized by internal treatment after removal of the mold.

Another object of the invention is the use of containers according to the invention as motor fuel container for automobiles.

The container according to the invention is particularly suitable for use as motor fuel container in automobiles, but it is, of course, susceptible for use in other fields such as containers for air planes or helicopters, jerrycans, cisterns, various canisters, etc.

These containers may be submitted advantageously to a surface treatment of the inner layer. The surface treatment is advantageously a fluoration treatment.

The container according to the invention is further illustrated in a non-limiting manner by way of the practical example below:

EXAMPLE

Containers having a content of 83 liters and of 5 mm average wall thickness and either a single layer structure or a dual-layer structure, were produced by blow molding, these containers were internally treated by fluoration on the production line.

To this end, different types of high-density polyethylenes were used with the first (HDPE1) being a polyethylene adapted to the production of containers exhibiting excellent mechanical properties, and the second (HDPE2) being a polyethylene adapted to the fluoration treatment with the characteristics of these two polymers being listed in Table 1 below:

TABLE 1

| Characteristics | Methods | HDPE2 | HDPE1 | Units |
|---|---|---|---|---|
| Density | ISO R 1183 | 946 | 948 | kg/m$^3$ |
| Fluidity under 2.16 kg | ISO 1133 | <0.1 | <0.1 | g/10 min |
| Fluidity under 5 kg | ISO 1133 | 0.22 | .4 | g/10 min |
| Fluidity under 21.6 | ISO 1133 | 5.6 | 7.0 | g/10 min |
| Apparent Dynamic | | | | |
| Viscosity at 190° and 100 s$^{-1}$ | — | 3100 | 2800 | Per sec. |
| Resilience* | ISO 180/4A | 34 | 57 | kJ/m$^2$ |
| Additives: | | | | |
| IRGANOX ® 1076 | | 1 | 0.65 | g/kg |
| RADIASTAR ® 1060 | | 0 | 1 | g/kg |
| SANTONOX ® 1060 | | 0 | 0.65 | g/kg |

*IZOD Impact bending strength when notched at −40° C. and on a 3.2 mm specimen.

The HDPE2 further exhibits the following properties:

Quantity of volatile compounds collected by way of thermal desorption under a helium stream at 275° C.: approximately 1400 mg/kg;
Soluble fraction in boiling hexane: 7.5 g/kg;
Soluble fraction in boiling heptane: 35 g/kg.

IRGANOX 1076 is a phenolic antioxidant product and marketed by CIBA GEIGY. The inner layer is free of any other additive and pigment.

RADIASTAR 1060 is a calcium stearate product and is marketed by OLEOFINA.

SANTONOX is a phenolic antioxidant and sulfurized product marketed by MONSANTO.

The containers were produced in a single layer of the two above-mentioned resins and in a two-layer structure with HDPE1 in the outer layer and HDPE2 in the inner layer of 0.5 mm thickness. HDPE2 was used in the form of powder.

On the production line, the containers were subjected to a conventional fluoration treatment at an ambient temperature and using 16 g of fluorine (diluted to 1.6% in nitrogen), with the blow molding time for the piece being increased to 120 sec.

The permeability and impact resistance of different containers manufactured in this manner was subsequently evaluated comparatively.

In order to evaluate the permeability, the different type of containers were filled to 50% of the useable capacity and stored at 40° C. according to the European Guideline ECE 34 Addendum 5. The fuels used were either standard virgin gasoline CEC-RF-08-A85 or a mixture thereof with methanol at a ratio of 85% gasoline to 15% methanol by volume. The weight losses of fuel from different containers were measured every week for four months. The losses observed at the end of this period are listed in Table 2 below, the losses from a conventional container (single layer of fluorinated HDPE1) were taken as reference value.

For the evaluation of impact resistance, different containers were filled to their full capacity with an equal mixture of ethylene-glycol and were stored for 24 hours in an enclosure maintained at −40° C. These containers were subsequently dropped from a height ranging from 3 to 6 m at increments of 1 m. The average length of rupture noted is also indicated in the table.

TABLE 2

| | Relative Losses at 40° C. | | |
|---|---|---|---|
| | Gas | Gas + methanol | Height of Drop Causing the Rupture |
| Single Layer HDPE1 | 100% | 100% | no rupture to 6 m |
| Single Layer HDPE2 | 66% | 28% | 4 m |
| Two-layer HDPE1 and HDPE2 | 66% | 28% | no rupture to 6 m |

It seems therefore that the two-layer structure exhibits impermeability equal to a more fragile single-layer container of HDPE2 resin while retaining impact resistance equal to that of a more permeable container produced with HDPE1 resin.

What is claimed is:

1. A multilayer container for storing hydrocarbon, said container having walls comprising at least two layers, including at least one outer layer consisting of a thermoplastic material, and an inner layer consisting of a thermoplastic material of at least one virgin polyolefin subjected to a surface treatment by fluoration or sulfonation for the purpose of increasing its impermeability to hydrocarbons, said inner layer containing one or a plurality of hydroxyaromatic compounds—whose hydroxyl group is stearically hindered, compounds whose total weight in any case does not exceed about 1.3 g per kg of thermoplastic material constituting the inner layer.

2. The container according to claim 1, wherein the inner layer consists essentially of high density virgin polyethylene.

3. The container according to claim 2, wherein the two layers are produced from polyethylenes.

4. The container according to claim 1, wherein the two layers are produced from polyolefins.

5. The container according to claim 1, wherein the inner layer is essentially free of any pigment.

6. The container according to claim 1, wherein the inner layer is essentially free of any additive.

7. The container according to claim 1, wherein the thermoplastic material of the inner layer is such that volatile compounds collected by thermal desorption of said thermoplastic material under a stream of helium at 275° C. do not exceed about 1700 mg per kg of thermoplastic material.

8. The container according to claim 1, wherein the inner layer is such that its soluble fraction in boiling hexane is less than about 9 g per kg of thermoplastic material constituting the inner layer and that its soluble fraction in boiling heptane is less than about 42 g/kg.

9. The container according to claim 1, wherein the outer layer has a thickness ranging between about 1 to 20 mm.

10. The container according to claim 1, wherein the inner layer has a thickness ranging between about 10 microns and 1 mm.

11. The container according to claim 1, wherein the two layers are produced from ethylene homopolymer.

12. In a fuel container for automobiles, the improvement comprising a container according to claim 1.

13. The container according to claim 12, wherein the container is subjected to a fluorination treatment.

* * * * *